United States Patent
Hayashi et al.

(10) Patent No.: US 6,795,921 B2
(45) Date of Patent: *Sep. 21, 2004

(54) APPARATUS AND METHOD FOR TRANSLATING WITH DECODING FUNCTION

(75) Inventors: Masakazu Hayashi, Kanagawa (JP); Kenji Kazumura, Kanagawa (JP); Yuji Watanabe, Kanagawa (JP); Kohichiro Hotta, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,678

(22) Filed: Jun. 2, 1998

(65) Prior Publication Data

US 2001/0039651 A1 Nov. 8, 2001

(30) Foreign Application Priority Data

Dec. 24, 1997 (JP) ................................................ 9-355668

(51) Int. Cl.[7] .............................. H04L 9/00; G06F 9/45
(52) U.S. Cl. ...................... 713/200; 713/153; 713/190; 717/140; 717/151
(58) Field of Search ................................. 713/200, 201, 713/153, 164, 165, 189, 190, 193; 717/5, 6, 7, 8, 3, 136, 140, 141, 143, 151, 152, 114, 126, 129, 174

(56) References Cited

U.S. PATENT DOCUMENTS

| | | | | |
|---|---|---|---|---|
| 5,276,881 A | * | 1/1994 | Chan et al. ................ | 717/147 |
| 5,280,613 A | * | 1/1994 | Chan et al. ................ | 717/147 |
| 5,339,419 A | * | 8/1994 | Chan et al. ................ | 717/147 |
| 5,375,239 A | * | 12/1994 | Mortson ...................... | 717/5 |
| 5,396,631 A | * | 3/1995 | Hayashi et al. ............ | 717/7 |
| 5,481,708 A | * | 1/1996 | Kukol ......................... | 717/9 |
| 5,604,908 A | * | 2/1997 | Mortson ...................... | 717/5 |
| 5,680,622 A | * | 10/1997 | Even ........................... | 717/154 |
| 5,835,771 A | * | 11/1998 | Veldhuizen ................. | 717/154 |
| 5,914,680 A | * | 6/1999 | Murashita ................... | 341/107 |
| 5,945,933 A | * | 8/1999 | Kalkstein .................... | 341/63 |
| 6,063,134 A | * | 5/2000 | Peters et al. ............... | 717/176 |
| 6,078,744 A | * | 6/2000 | Wolczko et al. ............ | 395/702 |
| 6,121,903 A | * | 9/2000 | Kalkstein .................... | 341/63 |
| 6,125,186 A | * | 9/2000 | Saito et al. ................. | 380/287 |

FOREIGN PATENT DOCUMENTS

| | | | | |
|---|---|---|---|---|
| EP | 0864969 A | * | 9/1998 | ............ G06F/9/00 |
| EP | 0926595 A2 | * | 6/1999 | ............ G06F/9/45 |
| EP | 1067796 A1 | * | 1/2001 | ............ H04N/7/24 |
| JP | 7-162409 | | 6/1995 | |
| JP | 2001134337 A | * | 5/2001 | ............ G06F/1/00 |
| JP | 2002140126 A | * | 5/2002 | ............ G06F/1/00 |

OTHER PUBLICATIONS

Aho et al, "Compilers, Principals, Techniques, and Tools" Mar. 1988, Addison–Wesley Publishing Company, p. 1–796.*

(List continued on next page.)

*Primary Examiner*—Ayaz Sheikh
*Assistant Examiner*—Christopher Revak
(74) *Attorney, Agent, or Firm*—Staas & Halsey LLP

(57) ABSTRACT

When an encoded source file is inputted to a compiler, the compiler decodes the encoded source file in certain units and partially restores the original source data. Then, the restored part is converted to an intermediate text in restored order, and an executable program is created from the intermediate text.

21 Claims, 13 Drawing Sheets

OTHER PUBLICATIONS

"Basics of Server–Side JavaScript", 1997, Netscape Communications Corporation, astro.uni–bonn.de/~webstw/cm/ns_js_ssa/jsserv.htm. p. 1–28.*

Hawblitzel et al, "SLK: A Capability System Based on Safe Language Technology", Apr. 15, 1997, Department of Computer Science Cornell University, p. 1–20.*

Schneier, "Applied Cryptography," 1996, John Wiley & Sons, Inc., Second Edition, p. 226.*

R. van den Assem and W.J. van Elk, "A Chosen–Plaintext Attack on the Microsoft BASIC Protection", pp. 36–45.

Paul Marquess, "Filter: decrypt—template for a decrypt filter", Perldoc.com, Dec. 19, 1995, pp. 1–2.

"Debian GNU/Linux, Version 1.3.1, CD 1, File \BO\Contents.001" Distribution on 2 CD–ROMS, Jul. 1997, pp. 1, 2, 196, 2501 XP002246178.

Urban Mueller: "Brainfuck compiler (Readme)" (Archieved) Web Page, Online! Jul. 28, 1997, pp. 1–3, XP002246179 Zurich (CH).

* cited by examiner

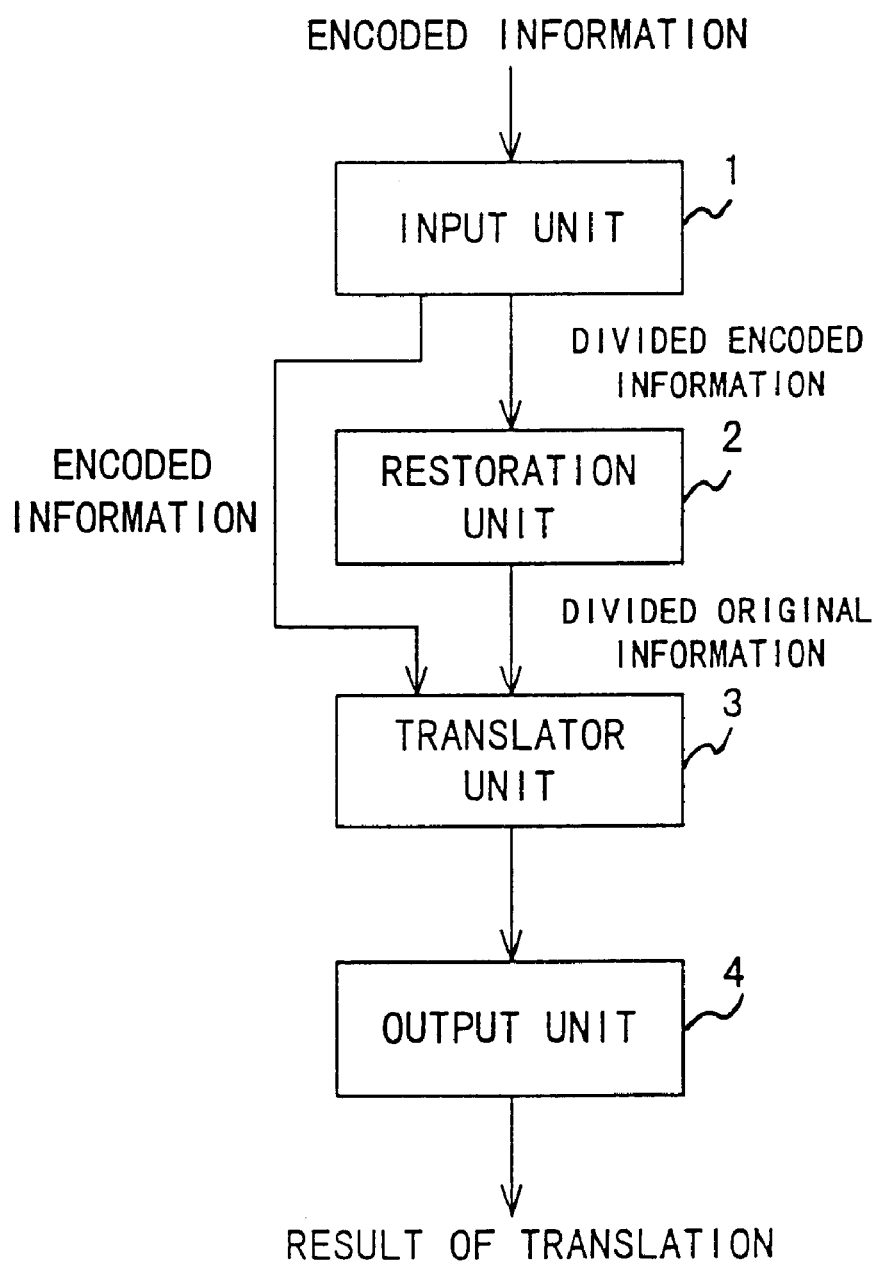
F I G. 1

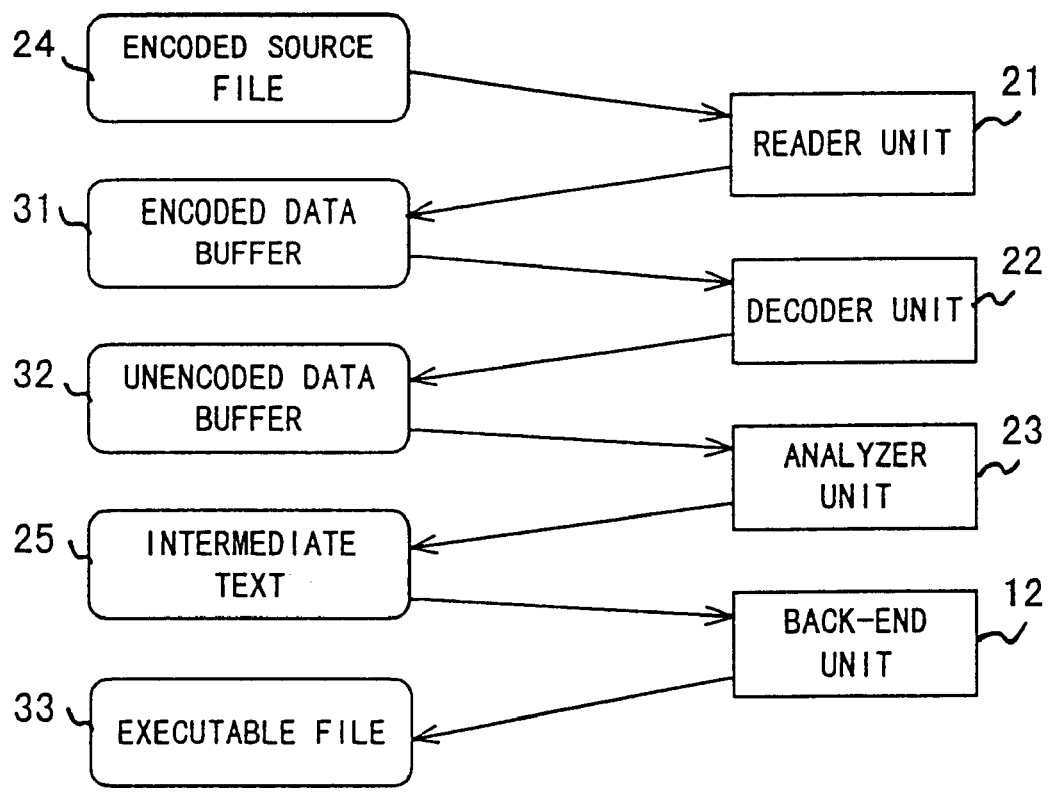
F I G. 3

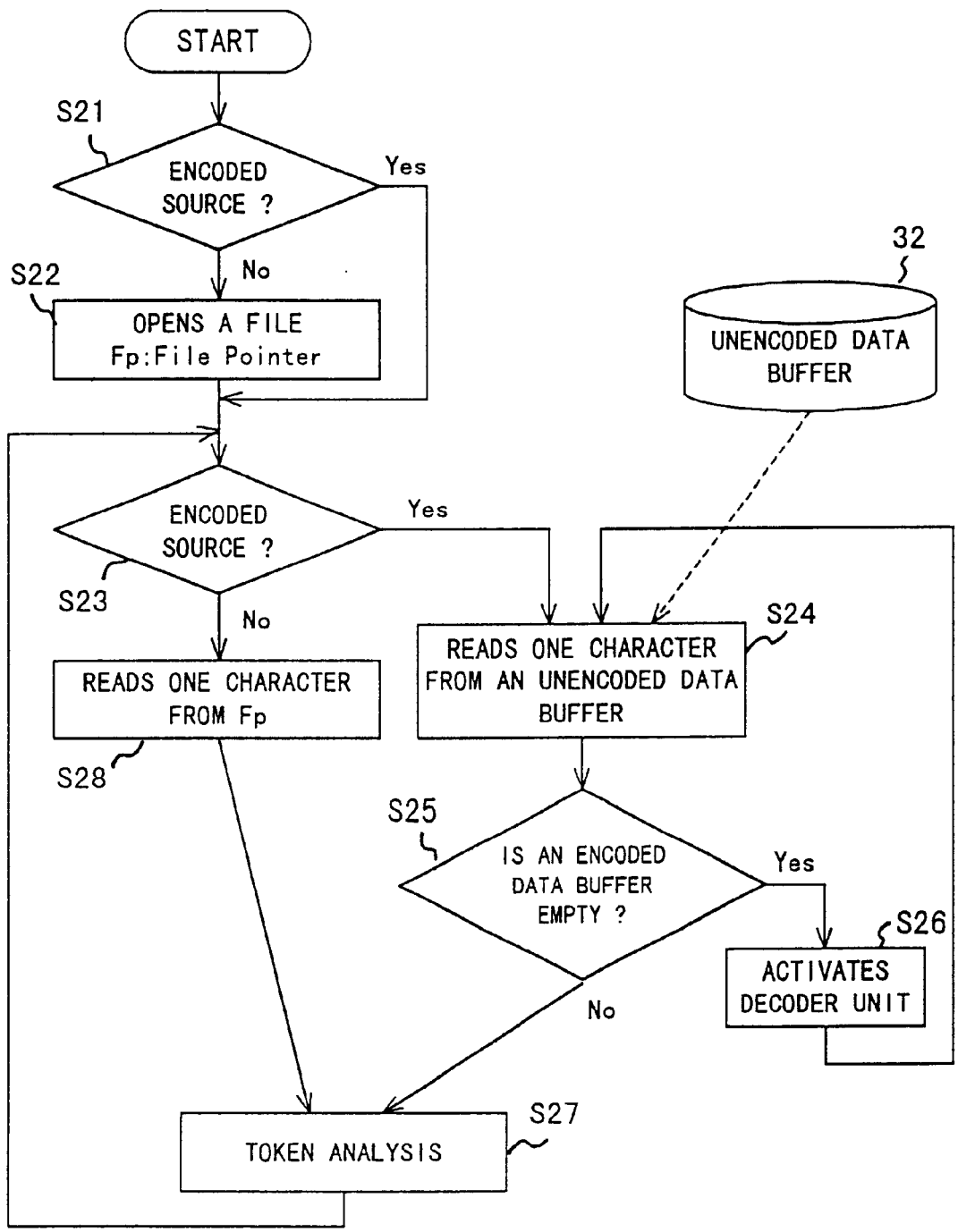
F I G. 6

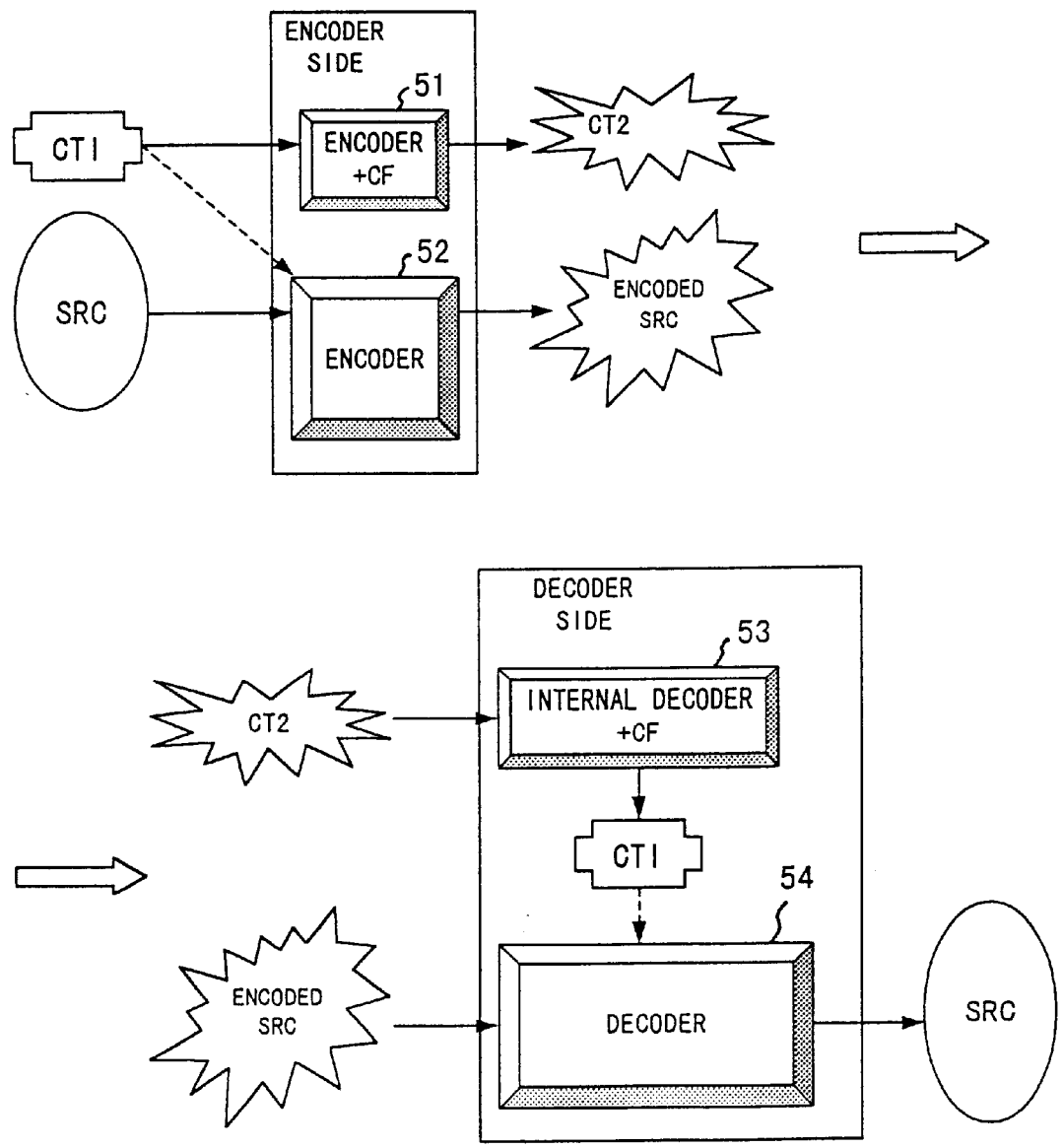
F I G. 7

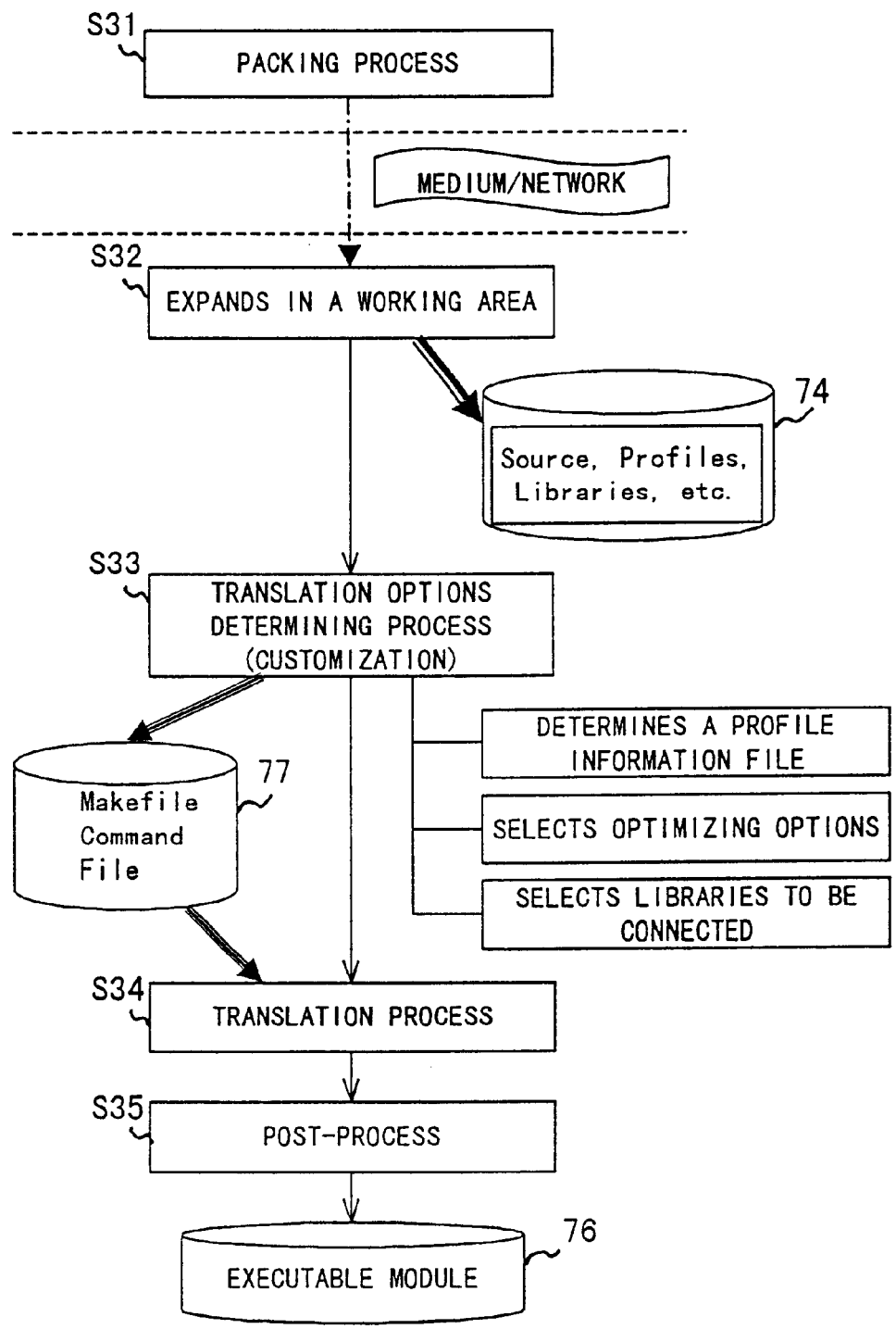
F I G. 1 1

APPARATUS AND METHOD FOR TRANSLATING WITH DECODING FUNCTION

BACKGROUND OF THE INVENTION

1. Field of the Invention

The present invention relates to an apparatus and a method for translating information such as source files encoded to protect the security of the information.

2. Description of the Related Art

Recently, the decentralized development of software utilizing computer networks, etc. has become popular, and along with this trend, many technologies relative to encryption to protect the security of information have been developed. For example, when a developer A wants to convey certain information I to a developer B using a network, etc., the developer A encodes the information I and transfers the information I to the developer B via a network. The developer B receives the information I and restores the information I. In this case, a technology of encoding and decoding information is widely utilized.

However, there is a case where the developer A wants to enable the developer B to use the information I possessed by the developer A for a process P possessed by the development B, but wants to protect the security of the information I from outsiders of the process P (operators, etc.). For example, this is the case where it is necessary to compile a program source of a new product corresponding to the information I in such an environment that persons other than those concerned can also access it. In this case, when the information I is decoded before compiling, there is a possibility that the information I may leak outside, even if the source file is transferred to the developer B after being encoded. Accordingly, the security of the contents of the source file cannot be completely protected.

Conventionally, protecting the security of the information using an encoding technology is directed to protecting the information from a third party other than the information provider A and information receiver B. For example, in a "Data Transfer Method" described in the Japan Laid-open Patent Publication No. 7-162409, a module for decoding encoded data is changed and compiled again every a certain time period and the object code of the module is transferred to a user of the encoded data. Thus, it is difficult for a third party to decode the encoded data.

However, this data transfer method is to protect the security of data from a third party, and a receiver of the data can easily obtain the data before encryption using the object code (including a decoder key) of the decoding module.

When an encoded source file is transferred, by executing in succession a command C1 for decoding and an existing compiler command C2, the receiver can compile the source file and create an object code file (executable module). However, when the commands C1 and C2 are just executed in succession, it is easy for an engineer familiar with an operating system (OS) and its commands to obtain the execution result of the command C1. Accordingly, it is difficult to protect the security of the contents of the source file from the receiver.

As described above, since in the conventional data transfer method there is a possibility that source information may leak, a provider of software distributes an executable module after compiling. Then, in a user's system, the software is customized by directly operating the given executable module.

However, in this operation only a part of the original executable module which includes an abundance of options is used, and there are also many parts in the distributed executable module unnecessary for a user. For this reason, it is necessary to install an executable module of an unnecessarily large size in a system, which is a problem.

Although preparation of an executable module customized by a provider according to a user's desire and distribution of the module can also be considered, in this case, a provider's work becomes troublesome, and too much load is generated on the provider, if the number of users increases.

SUMMARY OF THE INVENTION

It is an object of the present invention to provide a translation apparatus and method for providing users with a variety of software safely and without imposing too much load on a provider.

The translation apparatus of the present invention comprises an input unit, a restoration unit, a translator unit and an output unit.

In the first aspect of the present invention, the input unit divides encoded information into a plurality of parts and inputs the information to the restoration unit, and the restoration unit restores the original information for each part of the encoded information. Then, the translator unit translates the original information, and the output unit outputs the result of the translation.

Encoded information to be input is, for example, an encoded source file, and the restoration unit decodes the information and restores a source file to its state before encryption, and the translation unit compiles the decoded source file and creates an executable module.

At this moment, the restoration unit does not decode all the encoded information at once, but decodes the information little by little for each divided part of the information. Then, the translator unit translates the original information for each decoded part of the information.

In the second aspect of the present invention, the input unit inputs encoded information, and the translation unit executes a process for restoring the original information from the encoded information within the scope of the translation process, and translates the information without enabling the original information to be leaked outside. Then, the output unit outputs the result of the translation.

The translation apparatus does not translate all the encoded information after it has been decoded, but decodes the information within the scope of the translation process. At this moment, the translator unit executes a fused process of the restoration and translation processes, and generates the result of the translation from the encoded information.

BRIEF DESCRIPTION OF THE DRAWINGS

FIG. 1 shows the principle of the present invention.

FIG. 3 shows the flow of data.

FIG. 6 is a flowchart showing an analysis process.

FIG. 7 shows the first encoding/decoding process.

FIG. 11 is a flowchart showing the customization process.

DESCRIPTION OF THE PREFERRED EMBODIMENTS

Figure 2:
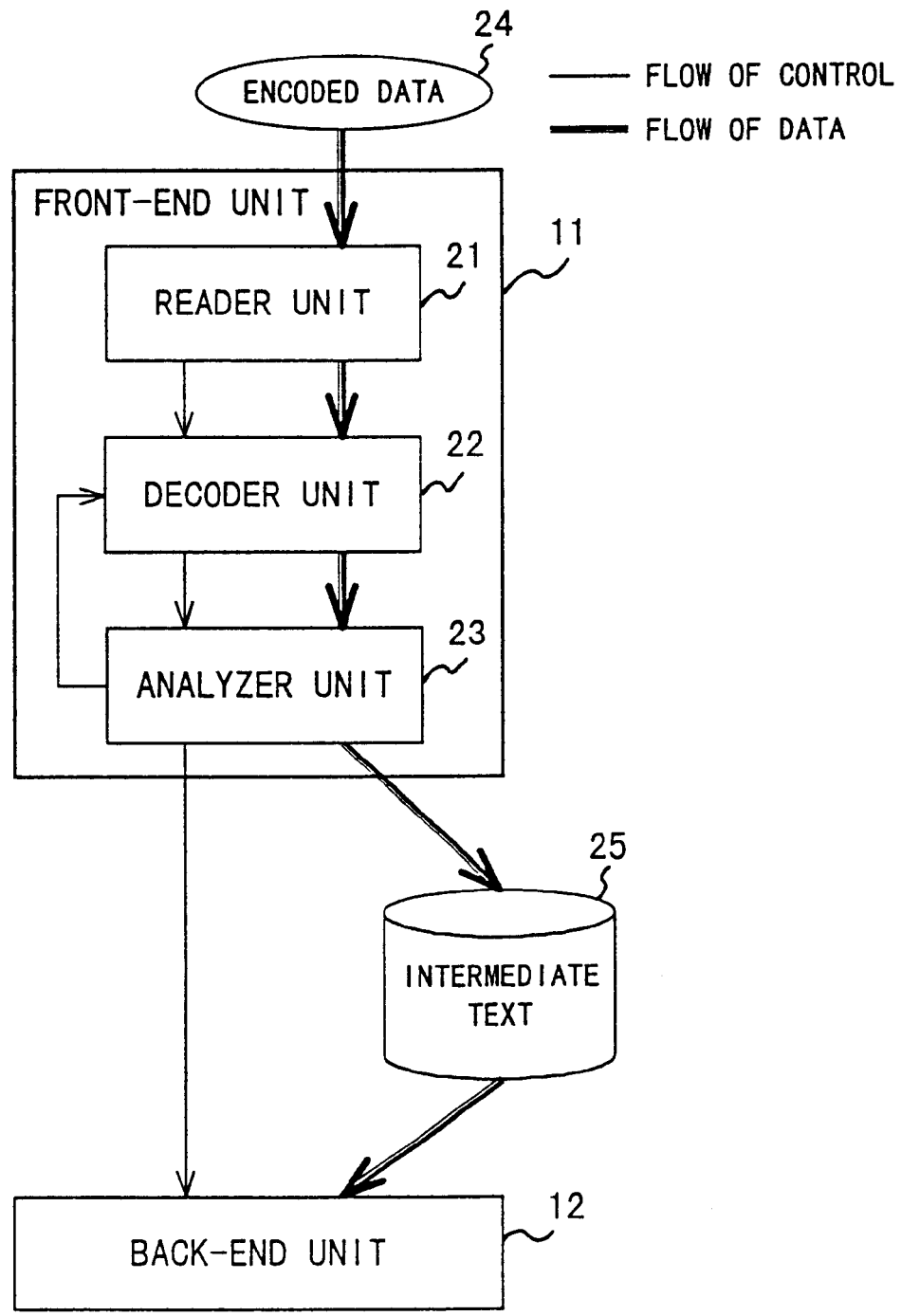
FIG. 2 shows a configuration of a compiler.

The embodiments of the present invention are described in detail below with reference to the drawings.

FIG. 1 shows the principle of a translation apparatus of the present invention. The translation apparatus shown in FIG. 1 comprises an input unit 1, a restoration unit 2, a translator unit 3 and an output unit 4.

According to the first principle of the present invention, the input unit 1 divides encoded data into a plurality of parts, and inputs the encoded information to the restoration unit 2, and the restoration unit 2 restores the original information for each part of the encoded information. Then, the translator unit 3 translates the original information, and the output unit 4 outputs the result of the translation.

Encoded information to be inputted is, for example, an encoded source file, and the restoration unit 2 decodes the information and restores a source file to the state before the encryption, and the translator unit 3 compiles the decoded source file and creates an executable module.

At this moment, the restoration unit 2 does not decode all the encoded information at the same time, but decodes the information little by little for each divided part of the information. Then, the translator unit 3 translates the original information for each decoded part of the information.

According to such a process, the original information is restored for each part of the information, but all of the information is not restored at the same time. Therefore, it is difficult for a user of a translator apparatus to acquire all the original information , and thereby translation can be executed while the security of the original information is being protected.

Software including many options can also be provided to users easily and safely. Furthermore, the result of translation can also customized by designating translation options in a user's system.

According to the second principle of the present invention, the input unit 1 inputs encoded information, and the translator unit 3 executes a process for restoring the original information from the encoded information within the scope of the translation process, and translates the information without enabling the original information to be leaked to the outside. Then, the output unit 4 outputs the result of the translation.

The translation apparatus does not translate all the encoded information at the same time after it has been decoded, but decodes the information within the scope of the translation process. At this time, the translator unit 3 executes a fused process of the restoration and translation processes, and generates the result of the translation from the encoded information.

According to such a process, the original information is restored only inside the translator unit 3, and can never leak outside the translation apparatus. Therefore, it is difficult for a user of the translation apparatus to acquire all the original information, and thereby translation can be executed while the security of the original information is being protected.

Software including many translation options can also be provided to users easily and safely. Furthermore, the result of translation can also be customized by designating translation options in the user's system.

For example, the input unit 1 shown in FIG. 1, the restoration unit 2, the translator unit 3 and the output unit 4, correspond to a reader unit 21, a decoder unit 22, an analyzer unit 23 and a back-end unit 12, and a back-end unit 12, respectively, shown in FIG. 2 and described later.

It is necessary to distribute information of a source file to users safely and to translate (compile) according to a user's desire in order to customize software in a user's computer system. In this case, It is desirable to encode the source file using a certain method and distribute the source file.

It is also necessary that even a receiver possessing a decoder key for encoded information cannot obtain the original information from outside of a certain process (or device), and it is desirable that the decoding function of the source file is included in a compiling process (or device). The present invention can meet such a desire, and can be widely used in various fields of industry.

FIG. 2 shows a configuration of a language compiler of this embodiment. The compiler shown in FIG. 2 comprises a front-end unit 11 and a back-end unit 12. The front-end unit 11 further comprises a reader unit 21, a decoder unit 22 and an analyzer unit 23.

When the reader unit 21 reads encoded data 24 (an encoded source file), the decoder unit 22 decodes the data in certain units, and inputs the decoded data to the analyzer unit 23. Then, the decoded data stored in the decoder unit 22 are automatically discarded after being inputted to the analyzer unit 23. The analyzer unit 23 executes analysis processes such as a token analysis (lexical analysis), a syntactic analysis, a semantic analysis, etc. for the inputted information in inputted order. Then, the decoder unit 22 and analyzer unit 23 repeat the same processes until there are no more encoded data 24.

When there are no more encoded data 24, and an intermediate text 25 being a program written in an intermediate language is outputted from the front-end unit 11, the back-end unit 12 optimizes the data and creates object codes based on the immediate text 25.

According to such a compiler, the inputted encoded source file is decoded in units of a predetermined minimum size by the decoder unit 22. Since this decoding process is an internal process of the compiler and the information is immediately discarded after being decoded in the predetermined units, the user cannot acquire all the information of the decoded source file from outside of the compiler, even if the user possesses the decoder key.

FIG. 3 shows the flow of data in the compiler shown in FIG. 2. In FIG. 3, the reader unit 21 inputs the encoded source file 24 to an encoded data buffer 31 in certain units, and the decoder unit 22 decodes the data in the encoded data buffer 31 and inputs the decoded data to an unencoded data buffer 32. The encoded data buffer 31 and unencoded data buffer 32 are provided in a memory.

Then, the analyzer unit 23 analyzes the data in the unencoded data buffer 32 in order and creates an intermediate text 25 in the memory, and the back-end unit 12 creates an executable file 33 from the intermediate text 25.

Figure 4:
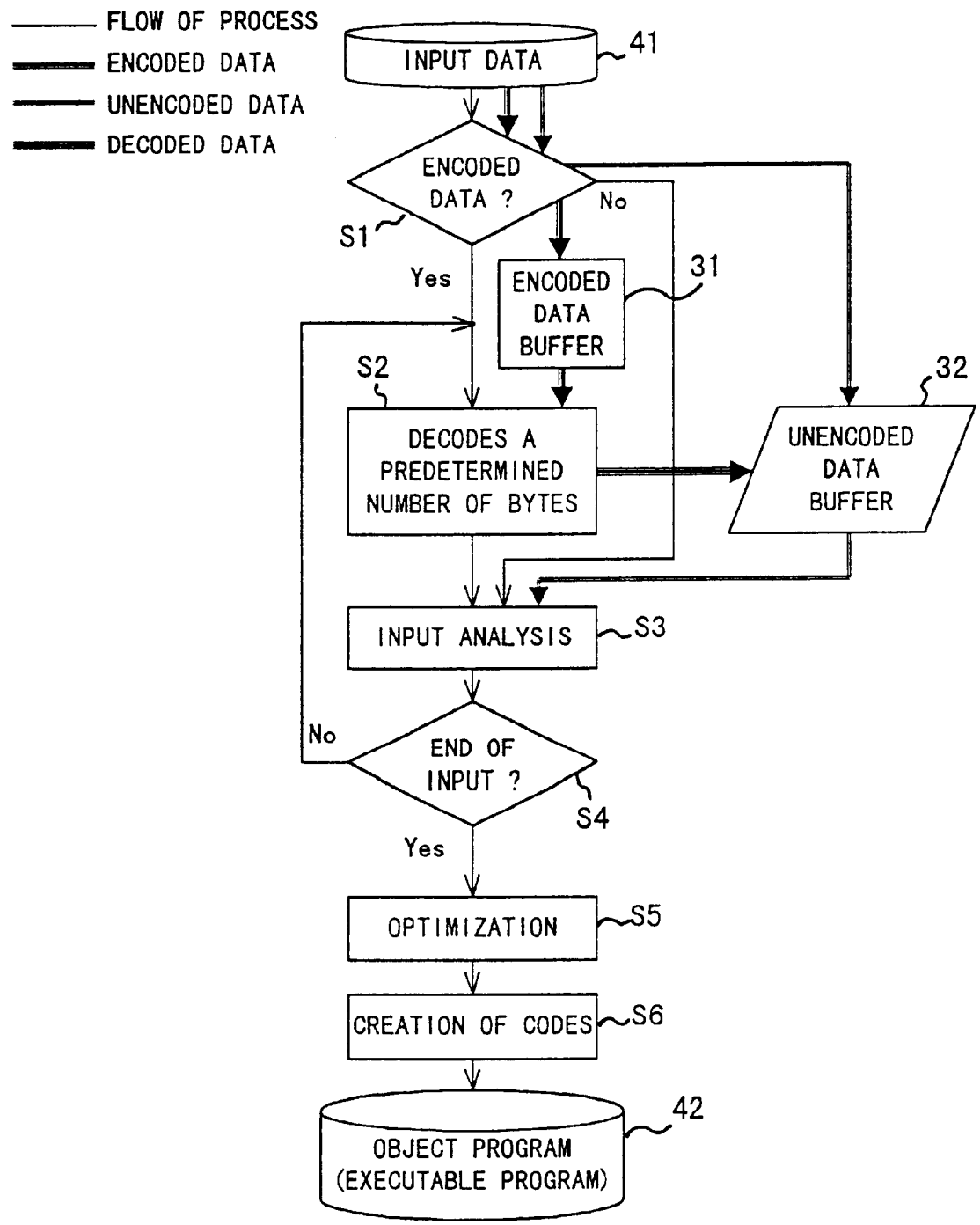
FIG. 4 is a flowchart showing a translation process.

FIG. 4 is a flowchart showing a translation process (compilation process) by the compiler shown in FIG. 2. First, the reader unit 21 judges from a magic number possessed by a file in the input data 41 whether or not the given input data 41 are encoded (step S1). If the data are encoded, the reader unit 21 inputs a predetermined number of bytes N of the data to the encoded data buffer 31. The decoder unit 22 restores source data from the data inputted to the encoded data buffer 31, and transfers the data to the unencoded data buffer 32 (step S2).

Then, the analyzer unit 23 reads the source data from the unencoded data buffer 32, analyzes only the read portion of the data and expands the data into an intermediate text 25 (step S3). The reader unit 21 then judges whether or not there are no more input data 41 (step S4). The N byte transfer by the reader unit 21, the restoration process by the decoder unit 22 and the analysis process by the analysis unit 23, are repeated until there are no more input data 41.

In this repetition, data in the encoded data buffer 31 and unencoded data buffer 32 are always overwritten and erased by new input data. Therefore, the entire source file is never reproduced in the unencoded data buffer 32. Then, when there are no more input data 41, an intermediate text 25 corresponding to the entire input data is automatically created.

On the other hand, when the input data 41 are by nature source files with a low priority of security and are not encoded in step S1, the reader unit 21 transfers the whole input to the unencoded data buffer 32, and the analyzer unit 23 converts all the input data to an intermediate text 25. In this case, all the input data 41 are processed in the one transfer.

If there are no more input data 41 in step S4, the back-end unit 12 optimizes the created intermediate text 25 (step S5), and creates codes via the processes of register allocation and instruction scheduling (step S6). Then, the back-end unit 12 outputs an object program 42 (executable program) corresponding to the executable file 33 shown in FIG. 3.

Figure 5:
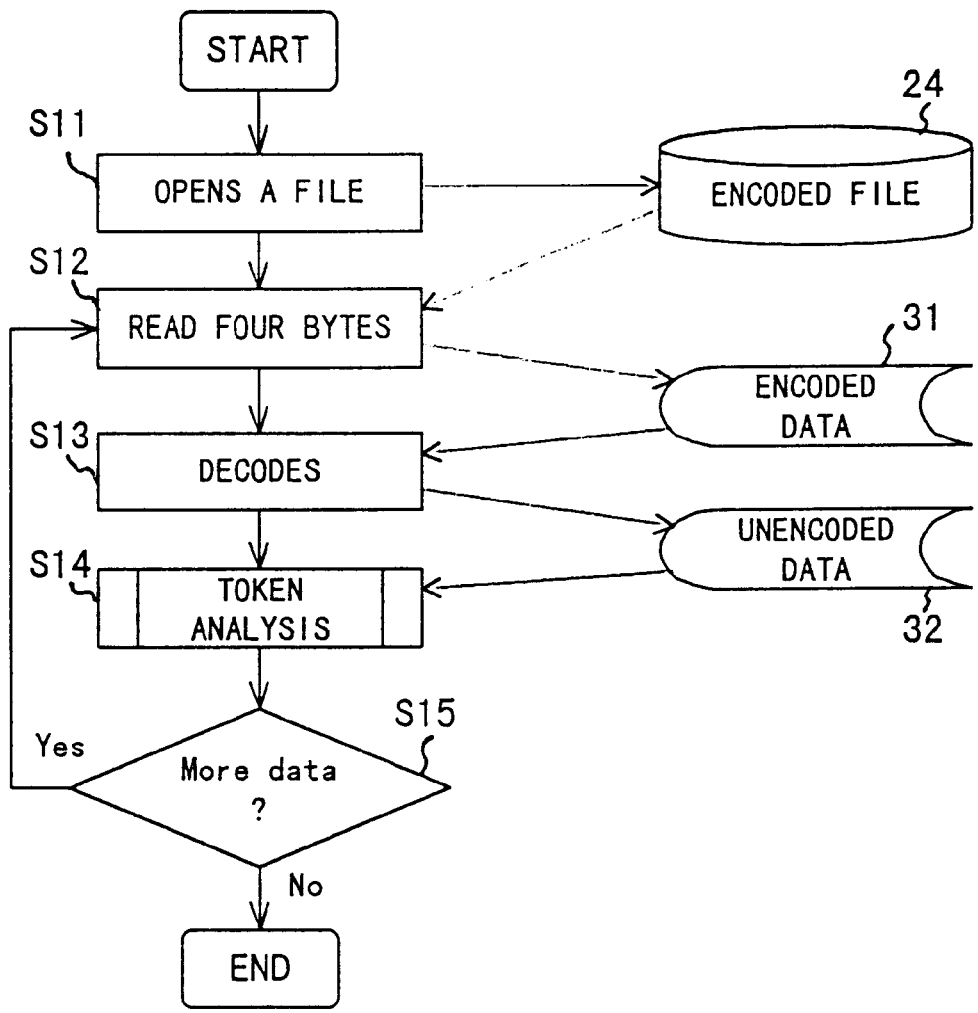
FIG. 5 is a flowchart showing a restoration process.

FIG. 5 is a flowchart showing an example of processes executed in steps S2, S3 and S4 shown in FIG. 4. For example, it is assumed that on the provider side of a source file, 16 bytes of the following original data are stored in a file "data 1".

ABCDEFGHIJKLMNOP

When these data are encoded and are stored in a file "data 2", the contents of the data will be as follows:

BCDEFGHIJKLMNOPQ

Although a Caeser cipher is used in this example, another cipher can also be used. When a file "data 2" is inputted to the compiler as the encoded source file 24, first, the reader unit 21 opens the file (step S11), and reads four bytes of encoded data into the encoded data buffer 31 (step S12). In the above-mentioned example, "BCDE" being the first four bytes are read into the encoded data buffer 31.

Then, the decoder unit 22 decodes the encoded data, and transfers the data to the unencoded data buffer 32 (step S13). In this example, "BCDE" are decoded, and "ABCD" being the original data are transferred to the unencoded data buffer 32.

Then, the analyzer unit 23 executes a token analysis for the data in the unencoded data buffer 32, and when a token is recognized, converts the data in order to an intermediate text 25 (step S14). In this example, the token analysis of data "ABCD" is executed.

Then, the processes in steps S12, S13 and S14 are repeated until there are no more data in the encoded source file 24 (step S15). When there are no more data in the encoded source file 24, the process in the front-end is terminated, and the reader unit 21 closes the file.

According to such a restoration process, since data in the unencoded data buffer 32 are erased sequentially, all the original data "ABCDEFGHIJKLMNOP" are never reproduced together. Accordingly, the translation of data can be executed while the security of the data is being protected.

FIG. 6 is a flowchart showing an example of the analysis process to be executed in step S3 shown in FIG. 4. When the reader unit 21 reads characters in a source file, the input source varies depending on whether or not the source file is encoded, that is, whether or not the file is routed via the decoder unit 22. If the file is encoded, the analyzer unit 23 reads characters from the unencoded data buffer 32 for storing the data output from the decoder unit 22. If the file is not encoded, the analyzer unit 23 reads characters directly from the file itself.

First, the analyzer unit 23 judges whether or not the input file is an encoded source file (step S21), and if the file is an unencoded source file, opens the file (step S22). At this moment, a file pointer Fp indicates the leading position of the file.

Then, the analyzer unit 23 judges again whether or not the file is an encoded source file (step S23), and if the file is an encoded source file, reads one character from the unencoded data buffer 32 (step S24), and judges whether or not the buffer is empty (step S25).

If the unencoded data buffer 32 is empty, the analyzer unit 23 instructs the decoder unit 22 to operate, and the decoder unit 22 restores a part of the encoded source file (step S26), and the processes in steps S24 and after are repeated. If the unencoded data buffer 32 is not empty, the analyzer unit 23 performs a token analysis over characters already read (step S27), and then repeats the processes of steps S23 and after.

If it is found in step S23 that the file is an unencoded source file, the analyzer unit 23 reads one character from the position pointed to by the pointer Fp (step S28), and executes the process in step S27, and then repeats the processes of steps S23 and after. At this moment, the pointer Fp is set to the position of the next character.

According to such an analysis process, if the source file is encoded, characters are read from the unencoded data buffer 32, and every time there is not a character in the buffer, the decoder unit 22 is instructed to operate. Therefore, more than a predetermined number of bytes of the source data are never reproduced in the unencoded data buffer 32.

By the way, in this embodiment, such a publicly known system for storing, for example, a common key or public key outside the compiler as a decoder key, can be used for the restoration process of a cipher. However, in fact, unless an encryption algorithm of its own is possessed, there is a high possibility that transferred information may be decoded by another decoder.

In a method of possessing only an external decoder key, since other arbitrary input data can also be encoded using the key and the decoding algorithm of a compiler, there is also a risk that the compiler may be used for purposes other than the original purpose. Therefore, when a compiler is to be used only for a certain fixed purpose, this method is not recommended.

Accordingly, in that case, the compiler is prevented from being used for purposes other than the purpose of compiling a specific source file by possessing a decoder key within the compiler.

FIG. 7 shows an configuration example of such an encoding/decoding process. In FIG. 7, the encoder side for transmitting a source file (SRC) comprises encoders 51 and 52, and the compiler on the decoder side comprises an internal decoder 53 and a decoder 54. A common key CF is built in both the encoder 51 and internal decoder 53 in binary code, which cannot be accessed from the outside. For the encryption algorithm, for example, a DES (Data Encryption Standard) is used.

First, the encoder unit 52 encodes a source file SRC using another common key CT1 different from CF, and creates an encoded source file. The encoder unit 51 encodes the common key CT1 using the internal common key CF, and creates an encoded common key CT2. Both the encoded source file and CT2 are transferred from the encoder side to the decoder side.

When receiving CT2, the internal decoder 53 restores the common key CT1 from CT2 using the internal common key CF, and passes the common key CT1 to the decoder 54. The decoder 54 decodes the encoded source file using the common key CT1, and thus restores the source file SRC.

Although in this example a method of possessing an internal common key in a compiler is used, the present invention is not necessarily limited to this method. Instead of encoding and transferring an entire source file, the source file can be divided into a plurality of parts, and each part can be encoded and transferred. In this case, it is convenient if the restoration unit of the compiler is used for the dividing unit. Furthermore, not only a common key system but also a public key system can be processed in the same manner.

Figure 8:
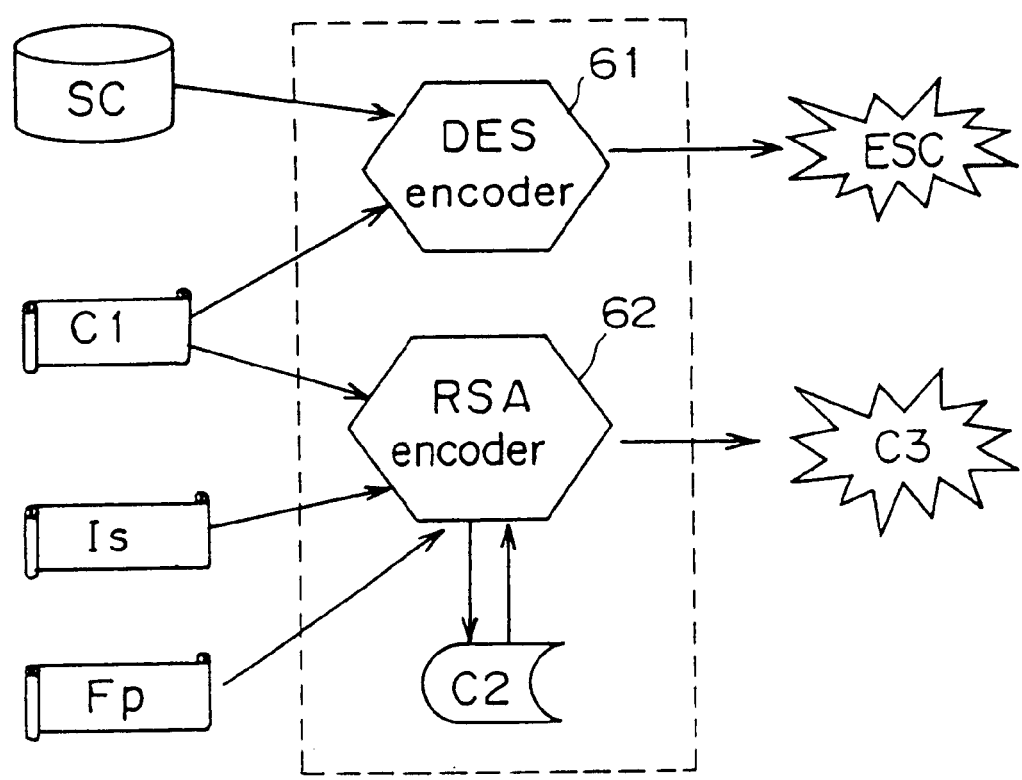
FIG. 8 shows the second encoding process.
Figure 9:
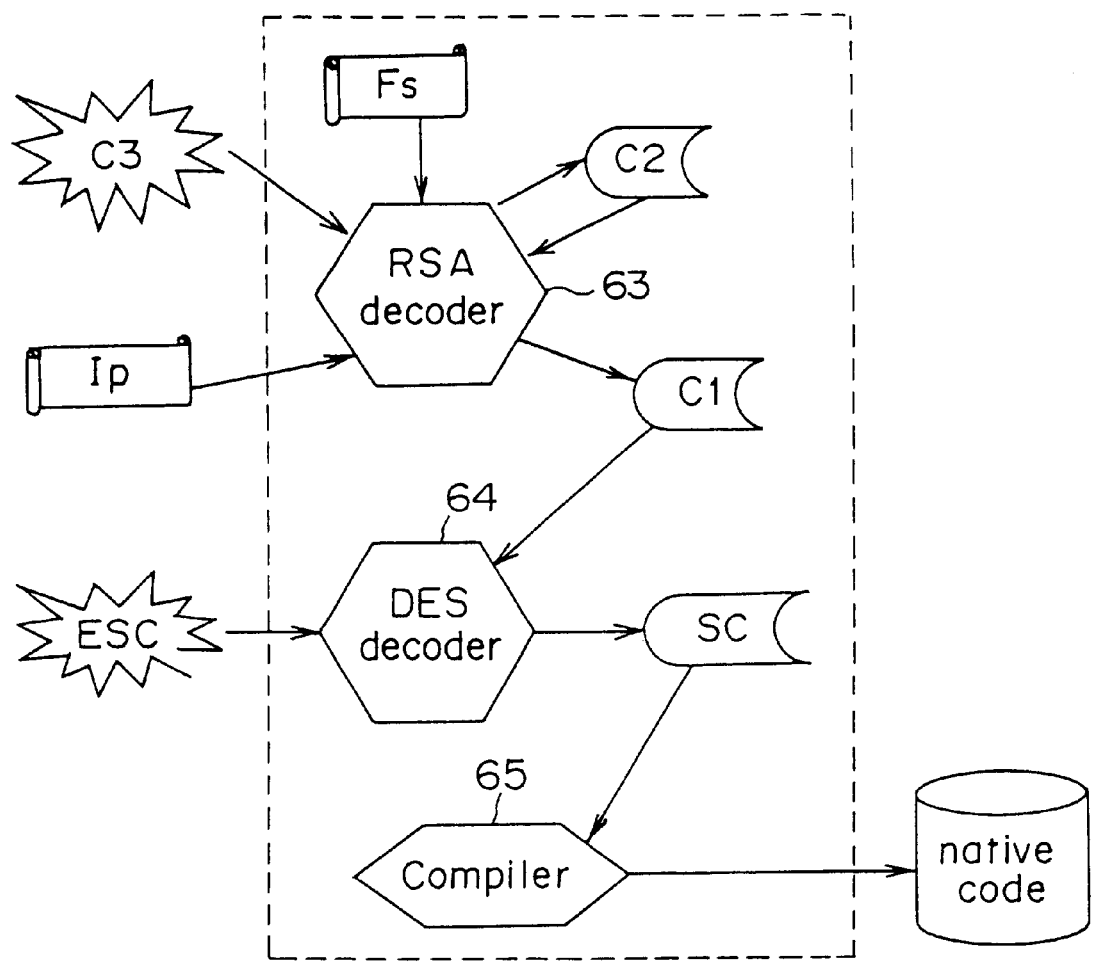
FIG. 9 shows the second decoding process.

FIG. 8 shows an configuration example of an encoding process based on a public key system, and FIG. 9 shows a configuration example of the decoding process. In this example, the combination of a DES being a common key system and an RSA (Rivest-Shamir-Adleman) being a public key system are used, and two sets of private key/public key of RSA are used.

In FIG. 8, a DES encoder 61 of the encoder side encodes source codes (SC) in accordance with the DES using a common key C1, and creates encoded source code (ESC). In the meantime, an RSA encoder 62 encodes the common key C1 in accordance with the RSA using a private key Is, and creates an encoded common key C2. Further, the RSA encoder 62 encodes C2 in accordance with the RSA using a public key Fp, and creates an encoded common key C3. Both the encoded source code ESC and C3 are transferred from the encoder side to the decoder side.

In FIG. 9, when receiving C3, an RSA decoder 63 of the decoder side restores C2 from C3 in accordance with the RSA using the built-in private key Fs, and stores C2 in an internal buffer. Further, the RSA decoder 63 restores C1 from C2 in accordance with the RSA using a public key Ip, and stores C1 in the internal buffer. Then, a DES decoder 64 decodes the encoded source code using the restored common key C1, and restores the source code.

Then, the source codes are compiled by a compiler 65, and are converted to object codes (native codes). In fact, since source codes are restored in certain units, the DES decoder 64 is repeatedly called up from a front-end unit of the compiler 65.

In the examples shown in FIGS. 8 and 9, five keys in total, that is, a common key C1, a private key Is of the encoder side, a public key Ip of the encoder side, a private key Fs of the decoder side and a public key Fp of the decoder side are used. Out of these, Is and Ip, and Fp and Fs, are RSA combinations of an encoder key and a decoder key, respectively, and the public key Ip is distributed from the encoder side to the decoder side in advance. According to such a method, when the same encoded source code is distributed to a plurality of users, the security of ciphers can be improved by using different combinations of Is and Ip for each user.

By using a compiler as described above, applications distributed by a provider can be customized in a user's system, and thereby the size of applications can be reduced.

For example, it is assumed that an information originator A (provider) and an information receiver B (user) belong to independent systems, and the originator A possesses a plurality of information, encodes a part or all of the information, sends the information to the system of the receiver B, and the translation of the information is executed in this system. According to such a process, applications can be uniquely customized on the receiver B side by using the source information while the security of the source information stored by the originator A is protected.

Figure 10:
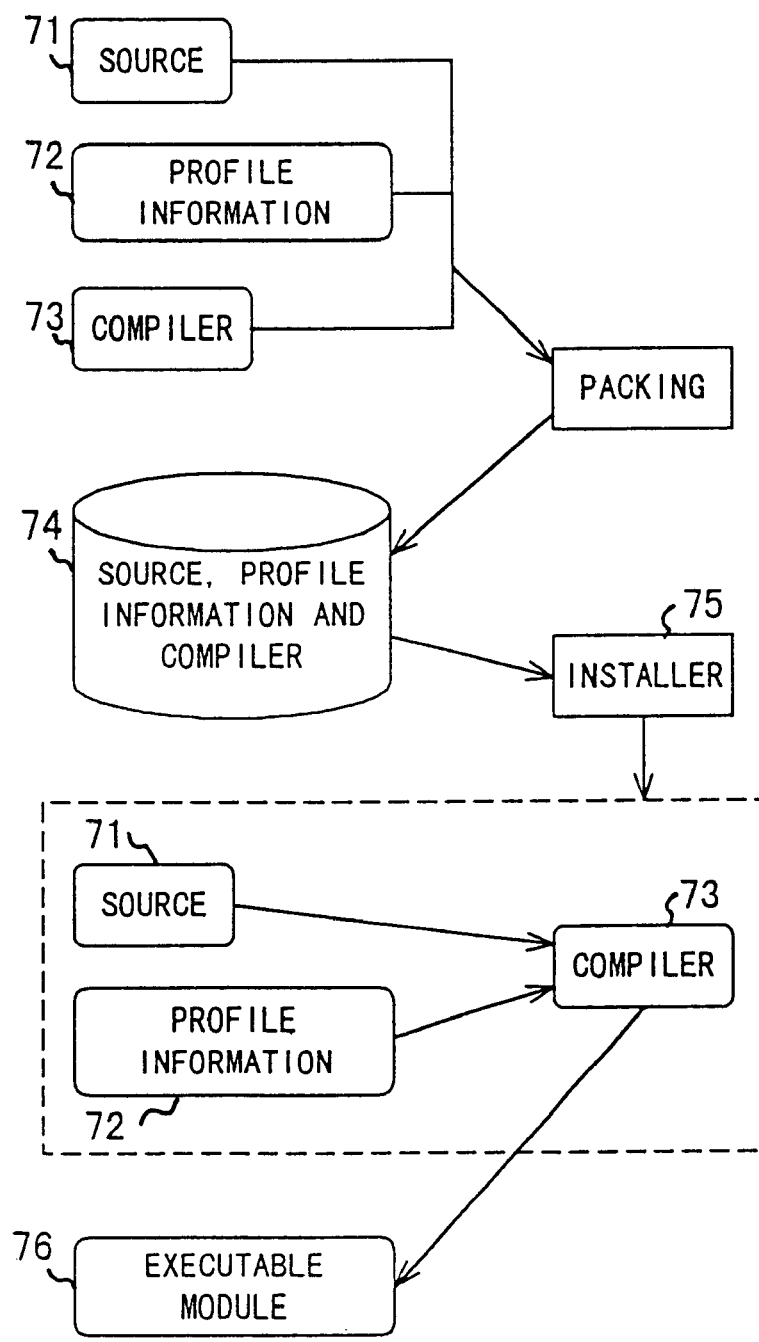
FIG. 10 shows a customization process.

FIG. 10 shows an example of such a customization process. In FIG. 10, the provider A packs an encoded source 71, profile information 72, a compiler 73, etc., as a package 74, and sends it to the user B. Profile information means information for optimizing a program including the branching probability of processes and the designation of subroutines (jump destination of a function call).

An installer 75 of the user B expands the package 74 in the memory, and customizes the application according to user's instructions. At this moment, the compiler 73 processes the source 71, profile information 72, etc. according to the instructions, and creates a customized executable module 76. If the compiler 73 is already in the user B's system, the compiler 73 is excluded from the package 74.

FIG. 11 is a flowchart showing the customization process. First, the provider A's system packs information needed for the customization process, such as the encoded source 71, profile information 72, compiler 73, etc. and a customization procedure instruction file according to a predetermined format/name (step S31). Then, the provider A's system transfers the package 74 to the user B via a storage medium such as a CD-ROM (compact disk read only memory), or a network, etc.

In the user B's system, the installer 75 expands the package 74 in a work area of the memory (step S32), and the user B designates translation options according to a system menu displayed by the customization procedure instruction file (step S33). In this case, for example, the following translation options are selected.

1. Selection of a profile information file to be used
   (a) Usage 1: Utilizes a profile information file corresponding to usage 1.
   (b) Usage 2: Utilizes a profile information file corresponding to usage 2.
   . . .
   (n) Usage n: Utilizes a profile information file corresponding to usage n.
2. Selection of optimization option
   (a) 01: Reduces the size of object codes (binary codes) to be created, as far as possible.
   (b) 02: Reduces the size of object codes (binary codes) to be created while maintaining the running speed at more than a certain level.
   (c) 03: Increases the running speed as much as possible.
3. Selection of a class library to be connected (a plurality of class libraries can be selected) LIB1, LIB2, LIB3, . . .

Then, the installer 75 creates compiler option information 77 suitable for the user from this selected input and from the architecture information of the system (CPU information, memory size, etc.). In the option information 77, commands for the compiler 73, etc. are described.

Then, the compiler 73 executes the translation process shown in FIG. 4 using the option information 77, and creates an executable module 76 from the source 71 (step S34). Since the executable module 76 created in this manner is optimized according to the instructions when customizing, the size of the executable module 76 becomes a required minimum for the user B.

Then, the installer 75 erases data such as the source 71 expanded in the work area, etc. When there is no schedule for maintenance or the work area is small, the installer 75 further erases the compiler 73 (step S35), and terminates the process.

By sending an encoded patch file corresponding to a part of the source 71 in place of the source 71, and describing patch expansion instructions in the customization procedure instruction file, the maintenance of software can also be carried out in the same procedure. In this case, a binary patch is mainly used. If a function of setting passwords is built in on the information originator side, the function can be designated when customizing.

The present invention can apply not only to the compilation process of source files as described above, but also to an arbitrary translation process of converting information written in a certain language into information in another language. For example, documents written in English can be translated into documents in Japanese, and programs written in a certain programming language can be converted into programs in another language.

Figure 12:
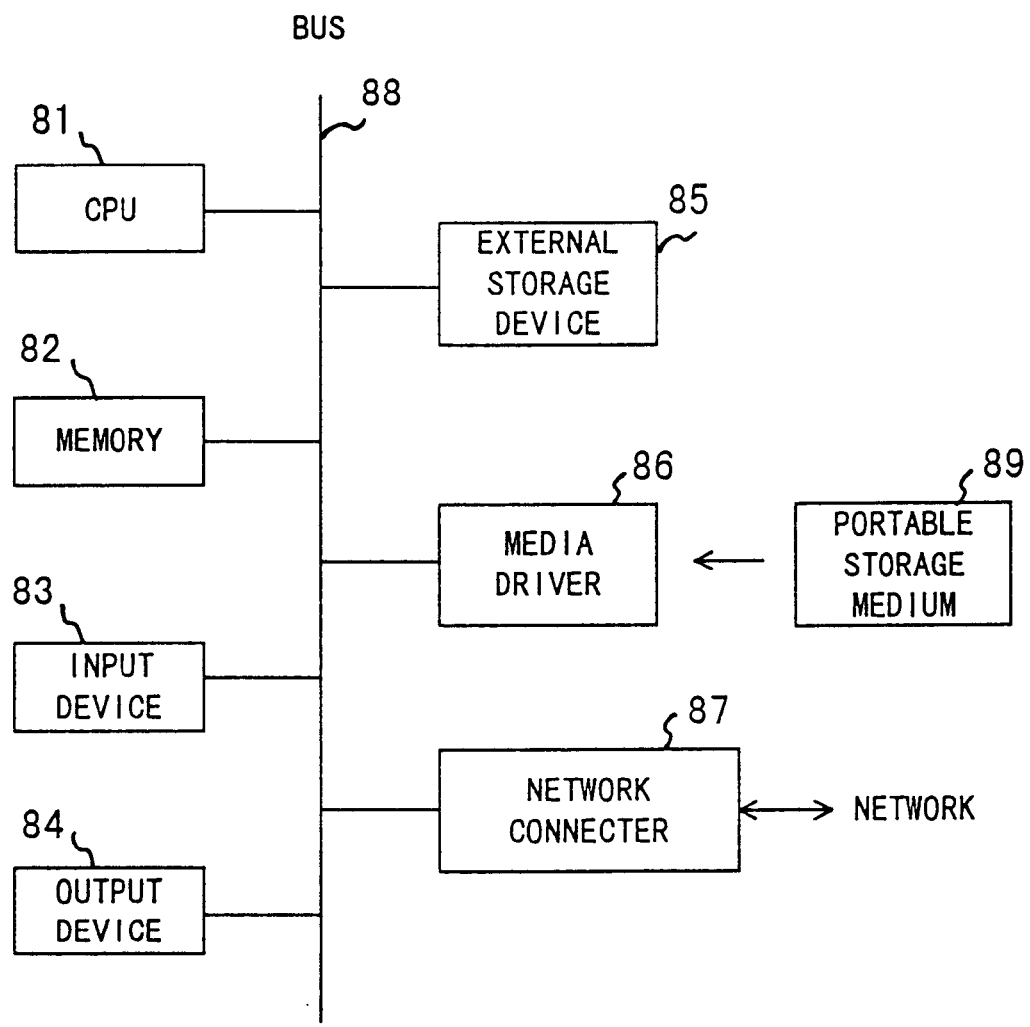
FIG. 12 shows a configuration of an information processing apparatus.

The respective system of a provider and a user is, for example, configured using an information processing apparatus (computer) as shown in FIG. 12. The information processing apparatus of FIG. 12 comprises a CPU (central processing unit) 81, a memory 82, an input device 83, an output device 84, an external storage device 85, a media driver 86 and a network connector 87, which are connected with each other via a bus 88.

In the memory 82, programs and data to be used for the process are stored. For the memory 82 are used, for example, a ROM (read only memory), RAM (random access memory), etc. The CPU 81 executes the necessary processes by running programs stored in the memory 82.

The input device 83 takes the form of, for example, a keyboard, pointing device, touch panel, etc., which are used to input instructions and information from the operator. The output device 84 takes the form of, for example, a display, printer, etc., which are used to output inquiries to the operator, the result of processes, etc.

The external storage device 85 takes the form of, for example, a magnetic disk, optical disk, magneto-optical disk, etc. This external storage device 85 stores the above-mentioned programs and data, which can also be used by being loaded to the memory 82, if necessary.

The media driver 86 drives a portable storage medium 89, and accesses the recorded contents. For the portable storage medium 89 are used an arbitrary computer-readable storage medium such as a memory card, floppy disk, CD-ROM, optical disk, magneto-optical disk, etc. This portable storage medium 89 is used for a provider to distribute information to users. The above-mentioned programs and data stored in the portable storage medium 89 can also be used by being loaded to the memory 82, if necessary.

The network connector 87 communicates with a provider's or user's apparatus via an arbitrary network (communication line), and performs data conversions. Thus, information can be transferred from a provider to a user. The above-mentioned programs and data can also be received from an external device and used by being loaded to the memory 82, if necessary.

Figure 13:
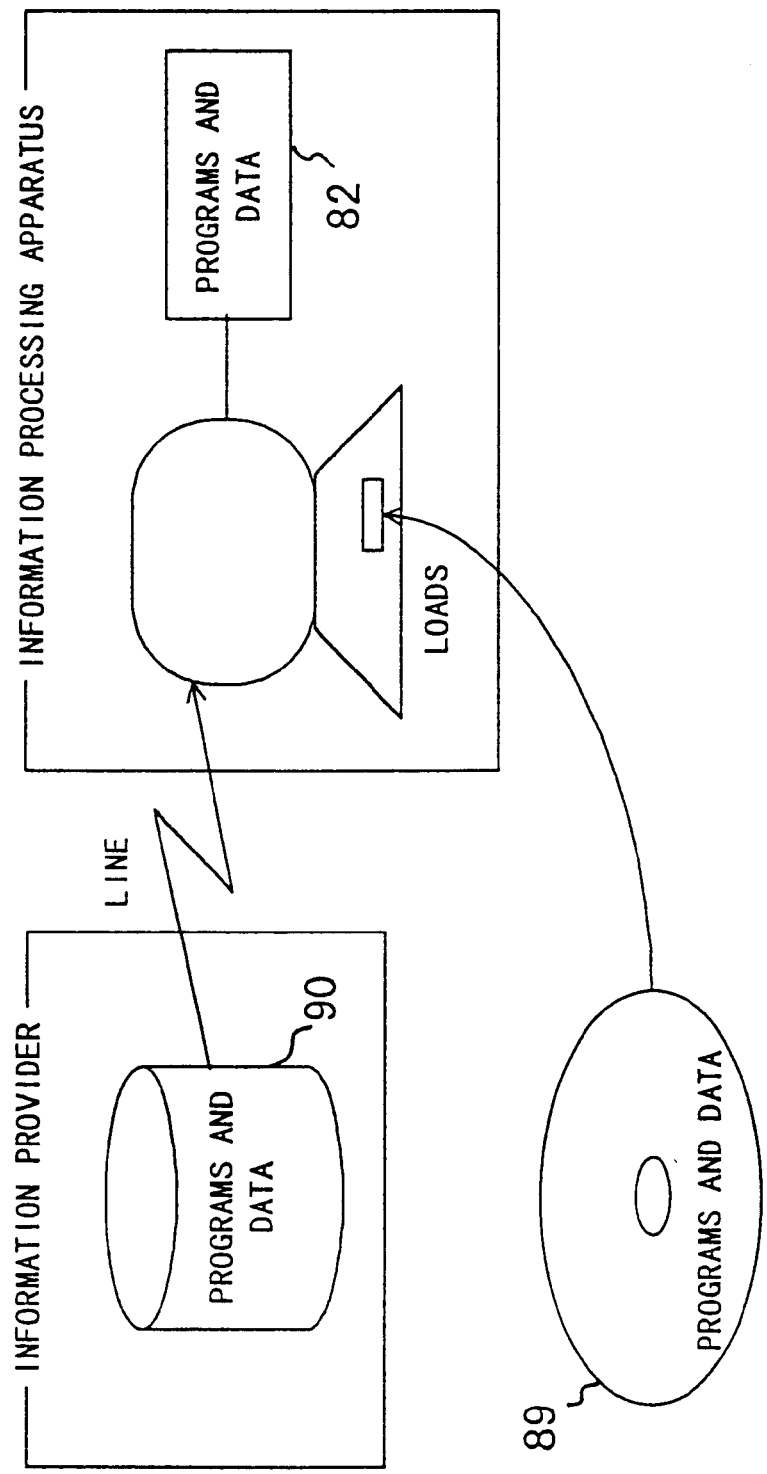
FIG. 13 shows storage media.

FIG. 13 shows computer-readable storage media for supplying the information processing apparatus shown in FIG. 12 with programs and data. The programs and data stored in the portable storage medium 89 and an external database 90 are loaded to the memory 82. Then, the CPU 81 executes the necessary processes by running the programs using the data.

According to the present invention, a variety of software can be easily and safely provided to users by fusing the restoration process and translation process of ciphers. Therefore, applications distributed from a provider can be customized in a user's system, and thereby the size of applications can be reduced.

What is claimed is:

1. A volatile or non-volatile computer-readable storage in which a program unit is stored, the comprising a program unit comprising:

an inputting unit dividing encrypted original source code information into encrypted parts;

a restoring unit receiving the encrypted parts and restoring, by decryption within the program, the encrypted parts to decrypted original information parts of said encrypted information and sequentially storing the decrypted parts to a buffer, where the buffer is overwritten after a decrypted part therein has been has been compiled and before a next decrypted part is compiled; and a compiling unit sequentially compiling within the program the decrypted original information parts in the buffer.

2. A volatile or non-volatile computer-readable storage in which a program unit is stored according to claim 1, wherein said restoring unit stores at least a part of key information for decoding said encoded information as internally built-in information, and restores said encoded information to said decoded original information using the key information.

3. A volatile or non-volatile computer-readable storage in which a program unit is stored according to claim 1, the program unit further comprising:

a customizing unit for customizing a result of a compilation by designating an option for said compiling unit.

4. A volatile or non-volatile computer-readable storage in which a program unit is stored according to claim 1, wherein the program unit further comprises an outputting unit outputting a result of a compilation.

5. An apparatus, comprising a program unit comprising:

a restoring unit restoring, by decryption within the program, encoded information to decoded original information of said encoded information;

a compiling unit compiling within the program the decoded original information; and an inputting unit dividing the encoded information into a plurality of parts and inputting the divided information, and wherein said restoring unit includes an encoded information buffer for storing said encoded information and decodes the information stored in the encoded information buffer, wherein said restoring unit includes an unencoded information buffer for storing said decoded original information, and when said compiling unit compiles information in the unencoded information buffer, erases the decoded original information which has been compiled.

6. An apparatus, comprising a program unit comprising:

a restoring unit restoring, by decryption within the program, encoded information to decoded original information of said encoded information;

a compiling unit compiling within the program the decoded original information; and an inputting unit dividing the encoded information into a plurality of parts and inputting the divided information, and wherein said restoring unit includes an encoded information buffer for storing said encoded information and decodes the information stored in the encoded information buffer, wherein said program unit further comprises inputting unit judging whether or not input information is encoded, and when the input information is encoded, inputting the input information to said restoring unit as said encoded information.

7. The apparatus according to claim 6, wherein when said input information is not encoded, said inputting unit inputs the input information to said compiling unit.

8. An apparatus, comprising a program unit comprising:
a restoring unit restoring, by decryption within the program, encoded information to decoded original information of said encoded information;
a compiling unit compiling within the program the decoded original information; and
an inputting unit dividing the encoded information into a plurality of parts and inputting the divided information, and wherein said restoring unit includes an encoded information buffer for storing said encoded information and decodes the information stored in the encoded information buffer, wherein
an encoded source file is said encoded information,
said restoring unit restores the decoded original source file, and
said compiling unit generates an intermediate text for the decoded original source file, and generates an executable program from the intermediate text.

9. A computer-readable storage medium storing a program which enables a computer to perform:
receiving encoded information encoded by encryption, inputting the information and dividing the encoded information into a plurality of parts;
restoring by decryption the encoded information to decoded original information, wherein said restoring comprises restoring for each divided part of said encoded information, and;
translating a programming language of said original information, wherein said translating comprises translating for each divided part.

10. A method of translating, comprising:
dividing the encoded information into a plurality of parts;
restoring to a run-time memory area encoded information to original information before encryption, wherein said restoring comprises restoring to the run-time memory area for each divided part of the encoded information, and;
translating directly from the run-time memory area said original information.

11. A method of compiling encrypted source code, comprising:
decrypting the segments in sequential segments and placing individual decrypted segments directly into a buffer as they are done being decrypted;
one of parsing and semantically analyzing the segments directly from the buffer as they become available in the buffer;
removing the segments from the buffer after they have been one of parsed and semantically analyzed; and
generating object code based on one of parsing and semantically analyzing.

12. A method according to claim 11, wherein one of parsing and semantically analyzing begins while there are segments of encrypted source code that have not been decrypted.

13. An apparatus for providing a user system with a source file, comprising:
a unit packing the source file, a compiler, and customization information, thereby generating package information; and
a unit outputting the package information,
whereby the output package information is expanded in the user system and the compiler compiles the source file according to the customization information to generate a customized executable module in the user system.

14. A computer-readable storage medium storing a program which enables a computer for providing a user system with a source file to perform:
packing the source file, a compiler, and customization information, thereby generating package information; and
outputting the package information,
whereby the output package information is expanded in the user system and the compiler compiles the source file according to the customization information to generate a customized executable module in the user system.

15. A method for providing a user system with a source file, comprising:
packing the source file, a compiler, and customization information, thereby generating package information; and
transferring the package information to the user system, whereby the output package information is expanded in the user system and the compiler compiles the source file according to the customization information to generate a customized executable module in the user system.

16. An apparatus comprising a program unit, the program unit comprising:
a restoring unit restoring, by decryption within the program, encoded information to decoded original information of said encoded information;
a compiling unit compiling within the program the decoded original information;
an inputting unit dividing the encoded information into a plurality of parts and inputting the divided information, and wherein said restoring unit includes an encoded information buffer for storing said encoded information and decodes the information stored in the encoded information buffer; and
said restoring unit includes an unencoded information buffer for storing said decoded original information, and when said compiling unit compiles information in the unencoded information buffer, erases the decoded original information which has been translated.

17. An apparatus, comprising:
a program unit comprising:
a restoring unit restoring, by decryption within the program, encoded information to decoded original information of said encoded information;
a compiling unit compiling within the program the decoded original information; and
an inputting unit judging whether or not input information is encoded, and when the input information is encoded, inputting the input information to said restoring unit as said encoded information.

18. The apparatus according to claim 17, wherein when said input information is not encoded, said inputting unit inputs the input information to said compiling unit.

19. A volatile or non-volatile computer-readable storage in which a program unit is stored, the program unit comprising:
key information that is a built-in part of the program unit and is separate from the original information;

a restoring unit restoring, by decryption within the program, encoded information to decoded original information of said encoded information;

a compiling unit compiling within the program the decoded original information; and said restoring unit restoring by decryption said encoded original information to decoded original information using the internally built-in key information.

20. A volatile or non-volatile computer-readable storage storing a program unit packaged with encoded source code information, the program unit comprising:

a restoring unit restoring, by decryption within the program, the encoded source code information to decoded original source code information of said encoded source code information;

a compiling unit compiling within the program the decoded original source code information; and a customizing unit for customizing the compiling of the compiling unit by designating a compiling option for said compiling unit, where the compiling option is pre-packaged with the program unit.

21. An apparatus, comprising:

a program unit comprising:

a restoring unit restoring, by decryption within the program, encoded information to decoded original information of said encoded information;

a compiling unit compiling within the program the decoded original information;

an encoded source file is said encoded information;

said restoring unit restores the decoded original source file; and said compiling unit generates an intermediate text for the decoded original source file, and generates an executable program from the intermediate text.

* * * * *

UNITED STATES PATENT AND TRADEMARK OFFICE
CERTIFICATE OF CORRECTION

| | |
|---|---|
| PATENT NO. | : 6,795,921 B2 |
| APPLICATION NO. | : 09/088678 |
| DATED | : September 21, 2004 |
| INVENTOR(S) | : Masakazu Hayashi et al. |

It is certified that error appears in the above-identified patent and that said Letters Patent is hereby corrected as shown below:

In the Claims

Column 10, line 3, Claim 1, delete "comprising a"

Signed and Sealed this
Twelfth Day of November, 2013

Teresa Stanek Rea
*Deputy Director of the United States Patent and Trademark Office*